United States Patent [19] [11] 4,090,457
Roberts [45] May 23, 1978

[54] MULTI-PURPOSE GARDEN TOOL
[76] Inventor: Glendell Roberts, Rte. 3, Box 29, Bristow, Okla. 74010
[21] Appl. No.: 804,052
[22] Filed: Jun. 6, 1977

Related U.S. Application Data
[63] Continuation of Ser. No. 601,451, Aug. 4, 1975, abandoned.
[51] Int. Cl.² ............................................. F23B 1/00
[52] U.S. Cl. ...................................... 111/82; 111/85; 111/73; 111/77; 172/354
[58] Field of Search .................... 111/77–78, 111/73, 7, 85–86, 79–82; 172/354–359

[56] References Cited
U.S. PATENT DOCUMENTS

| 5,858 | 10/1848 | Earle | 111/85 |
|---|---|---|---|
| 95,718 | 10/1869 | O'Callaghan | 172/356 X |
| 173,570 | 2/1876 | Albertson | 111/77 |
| 288,077 | 11/1883 | Lindsey | 111/77 |
| 350,964 | 10/1886 | Atkinson et al. | 111/77 |
| 439,811 | 11/1890 | Cooper | 111/73 |
| 606,835 | 7/1898 | Douglas | 172/354 |
| 627,964 | 7/1899 | Bateman | 111/82 UX |
| 977,773 | 12/1910 | Akins | 111/77 |
| 1,623,321 | 4/1927 | Smith et al. | 172/354 |
| 1,643,378 | 9/1927 | Hupp | 111/85 |

Primary Examiner—Robert E. Bagwill
Attorney, Agent, or Firm—Head, Johnson & Chafin

[57] ABSTRACT

A garden tool which serves as an ordinary hand operated plow but can be converted to a seed planter and fertilizer or to a wheelbarrow. The seed planter attachment has a plow point for opening a furrow, a seed and fertilizer dispenser and a device for covering the furrow. The moving parts of the planter are driven by a drag wheel and belt arrangement which also serves to pack down the loose dirt over the planted seeds.

5 Claims, 10 Drawing Figures

MULTI-PURPOSE GARDEN TOOL

This application is a continuation of Ser. No. 601,451, filed Aug. 4, 1975, and now abandoned.

BACKGROUND OF THE INVENTION

1. Field of the Invention

The present invention relates to a multi-purpose gardening or farming implement and more particularly, but not by way of limitation to a hand pushed multi-purpose garden plow of light weight construction having a wheel barrow body attachable to the garden plow frame and a combination seed and fertilizer dispensing and planting device which is attachable to the plow frame.

2. Description of the Prior Art

The recent sharp rise in food prices along with the increasing awareness of health problems associated with poor dieting habits and food preservatives have caused a great upsurge in home gardens, ranging from small backyard plots to gardens large enough to provide for food canning.

These larger gardens are normally too small to justify the expense of acquiring motor driven vehicles or farm implements such as tractors but are too large to comfortably work by hand.

Therefore, there is a significant return to the simple, hand-pushed single wheel garden plow to aid in cultivating the soil.

In the past, such plows were normally made of durable steel frame construction with a single steel wheel which made for a rather heavy and cumbersome implement. Further, the interchangeable tools which were available with the plow amounted to an assortment of plow blades for various stages of cultivating the soil.

Planting and fertilization of the crops were largely done by hand with the aid of hoes, rakes and the like. Further the typical hand-pushed garden plows on the market today are made for the specific purpose of working the soil and hence are not in use except during the period of cultivation of the soil. Extra implements such as wheelbarrows and the like are also desirable in working the garden and gathering the fruits of the garden.

Many multi-purpose tools are available but in many cases, it is so difficult to interchange the parts that little practical use is made of these tools.

SUMMARY OF THE INVENTION

The present invention is a multi-purpose garden working implement which is particularly designed and constructed for overcoming the above disadvantages. The present invention generally comprises a single wheel push-type garden plow made of light weight tubular construction and utilizes a bicycle wheel or the like which is large in diameter and more easily pushed. The tubular frame member has a downwardly extending attachment rod which will accept the various ordinary soil cultivation tools such as plows, rakes and the like.

A seed planting attachment device is easily connected to the downwardly extending attachment rod for the frame member and generally comprises a specialized plow blade which is adjustable in height and has a means for opening the furrow for planting and for closing the furrow after planting has been accomplished.

The planting device also comprises a seed and fertilizer dispenser which accepts and deposits a premeasured amount of seeds and fertilizer into the open furrow created by the plow means.

A hopper is provided which feeds seed and fertilizer into the dispensing apparatus. Uniformity of distribution is accomplished by an internal agitator means inside the hopper.

The agitator associated with the hopper and the seed dispensing apparatus is driven by means of a drag wheel, a series of pulleys and a drive belt. The drag wheel also serves to tamp or pack down the loose dirt over the seeds that have just been deposited.

Therefore, it is apparent that after the soil has been cultivated and broken up, the plow mechanism and with seeding attachment may be pushed down each row whereby the mechanism will open a furrow, plant a predetermined number of seeds, along with a premeasured amount of fertilizer, close the furrow and pack the loose dirt thereover all in one operation.

When the seed planting embodiment and the plow embodiment is not in use, the invention includes a wheelbarrow body which is particularly adaptable for fitting directly on top of the frame member of the plow apparatus and is easily connected thereto for use in lawn and garden work.

DESCRIPTION OF THE DRAWINGS

Other and further advantageous features of the present invention will hereinafter more fully appear in connection with the detailed description of the drawings in which.

DETAILED DESCRIPTION OF THE INVENTION

Figure 1:
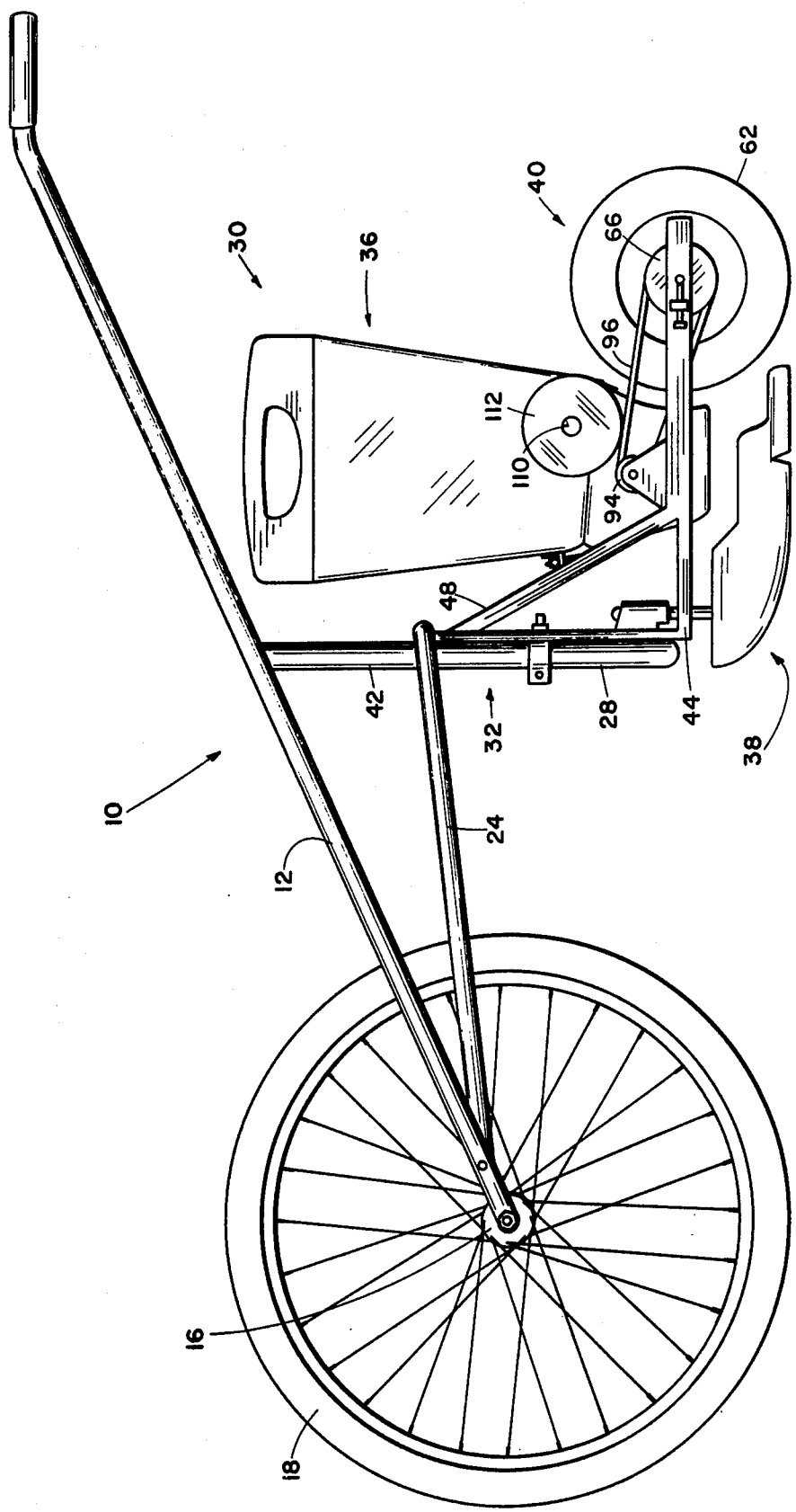
FIG. 1 is a side elevational view of a garden plow mechanism with an attached seed planting mechanism embodying the present invention.

Referring to the drawings in detail, reference character 10 generally indicates a multi-purpose garden plow for use with various gardening attachments. The basic plow mechanism comprises a pair of elongated tubular frame members 12 and 14 having one end of each member attached to the axle portion 16 of a bicycle type wheel 18. The tube members 12 and 14 extend upwardly and outwardly from their connection at the bicycle wheel 18 for form handle members and are provided with handle grips 20 and 22 respectively. The frame member further comprises a rearwardly extending U-shaped bar 24 having the end members attached to the elongated frame members 12 and 14 adjacent to the wheel axle 16.

The members 12 and 14 are also provided with a crossbar 26 connected therebetween and spaced from the edge of the wheel 18. A centrally disposed downwardly extending attachment rod 28 has the upper end thereof connected to the crossbar 26 and the mid-portion thereof being connected to the base of the U-shaped frame member 24. The portion of the rod 28 that extends below the U-shaped frame member 24 is used for connecting the plow instruments (not shown), and the seed planting mechanism which will be hereinafter set forth.

The seed planting mechanism indicated by reference character 30 generally comprises a frame assembly 32 which is connectable to the downwardly extending attachment rod 28, a seed and fertilizer dispenser apparatus 34 which is secured to the frame, a seed and fertilizer hopper means 36 removably secured to the upper portion of the dispensing means 34, a plow apparatus 38 adjustably secured to the frame means 32 and a drag wheel apparatus 40 which is rotatably secured to the frame means 32.

The frame means 32 comprises a vertically disposed plate member 42 which has attached to the bottom thereof a pair of rearwardly extending parallel frame bars 44 and 46 along with a pair of stiffening members 48 connected between the frame members 44 and 46 respectively and the vertically disposed plate 42. Attached to the frame member 44 is a vertically disposed standard 50 which is for a purpose that will be hereinafter set forth. The rear portion of the frame members 44 and 46 are provided with horizontal extending slots 52. Forward of each slot 52 is an outwardly extending plate 54 and 56 each with a longitudinally disposed set screw 58 and 60 threadedly extending therethrough for a purpose that will be hereinafter set forth.

The front surface of the vertical plate 42 is provided with a U-shaped bracket 43 for connection to the attachment rod 28.

The drag wheel means 40 comprises a wheel member 62 which is rotatably secured to an axle 64. The axle extends through the frame slots 52, with its longitudinal position within the slots being controlled by the set screws 58 and 60. The wheel means further comprises a pulley wheel or sheave 66 which is attached to the axle 64 for simultaneous rotation with the wheel 62.

The seed and fertilizer dispensing apparatus 34 generally comprises a housing 68 which is provided with an enlarged opening 70 in the upper portion thereof and a smaller opening 72 in the lower portion thereof and in communication with the opening 70. The upper rear portion of the housing is provided with a hinge member 74 and the upper forward portion of the housing is provided with a pivotally attached bolt 76 and associated wing nut 78.

A cylindrical seed and fertilizer dispensing wheel 80 is journaled within the housing 68 by way of a transversely disposed axle member 82. The wheel 80 is provided with a cylindrical boss member 84 at one end thereof, the boss having a slot 86 therethrough. The cylindrical wheel 80 is attached to the axle member 82 for rotation therewith by means of a codder pin 88 disposed in the slot 86 which also passes through a bore in the axle 82. The cylinder 80 is also provided with a plurality of spaced pairs of recesses 90 and 92 therearound for receiving predetermined measured amounts of seed and fertilizer respectively therein in a manner that will be hereinafter set forth. One end of the axle member 82 is journaled within the vertically disposed standard 50 of the frame means 32 exterior of the housing of the dispenser 68. Also attached to the axle 82 is a pulley member 94 which is keyed to rotate with the axle 82. The pulley 94 is disposed between the vertical standard 50 and the dispenser body 68 and is operably connected with the pulley 66 by means of a suitable belt 96. Therefore, when the wheel 62 is rotated, the cylinder 80 will be rotated in a like direction by means of the cooperating pulleys 66 and 94 and their associated belt 96.

The hopper means 36 comprises a vertically disposed container 98 which is open at both top and bottom and contains a divider plate 100 extending therethrough. The divider plate 100 serves to divide the container 98 into two compartments 102 and 104 for containing seed and fertilizer, respectively therein. Each compartment 102 and 104 is provided with an agitator wheel 106 and 108 both of which are supported by a rotating shaft 110. One end of the shaft 110 extends exteriorly of the container 98 and is provided with a friction wheel 112 mounted thereon. The edge of the friction wheel 112 is disposed in frictional engagement with the belt 96 hereinbefore described for rotation therewith which in turn rotates the agitator wheels 106 and 108 to keep the seed and fertilizer loose in the bottom of the container 98.

Figure 6:
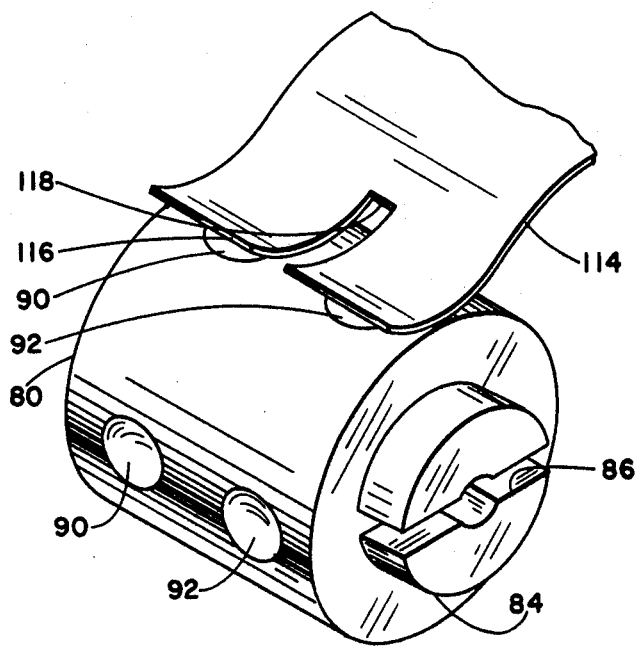
FIG. 6 is a detailed perspective view of the dispensing wheel of FIG. 5.
Figure 5:
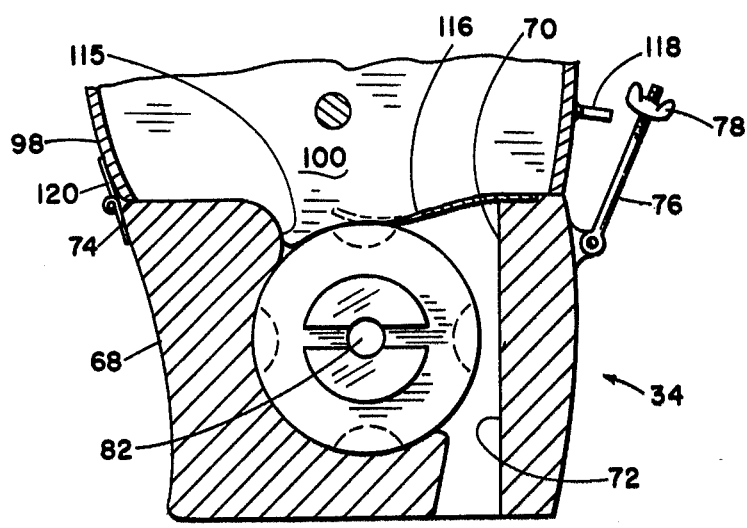
FIG. 5 is a side sectional view of the dispensing mechanism of FIG. 2 showing the dispensing wheel not in section.

The divider plate 100 further extends down into the opening 70 of the dispenser means 34 to ride in substantial contact with the upper portion of the dispensing wheel 80 as shown in FIG. 6.

An elongated flat wiper plate 114 has one end thereof attached to the upper forward portion of the dispenser body 68 and extends rearwardly and downwardly into the opening 70 in the upper portion thereof. The rear end portion of the plate 114 is curved upwardly at 116 and is provided with a centrally disposed forwardly extending slot 118 for a purpose that will be hereinafter set forth. The bottom of the plate 114 near the rear end thereof rides in springing frictional contact with the cylinder 80 to avoid crushing the seed.

The forward portion of the downwardly extending partition divider plate 100 is designated as 115 and rides directly in contact with the upper surface of the plate 114 and extends within the slot 118.

Therefore, the seed and fertilizer compartments 102 and 104 of the hopper are in open communication with the dispenser wheel 80 between the wiper plate 114 and the rear portion of the dispenser body 68.

The lower forward end of the hopper 98 is provided with an outwardly extending U-shaped bracket 118 for receiving the pivotal attachment bolt 76 therein and which is secured by the wing nut 78. The rear portion of the container 98 is provided with a hinge member 120 for cooperation with the hinge member 74 of the dispensing unit 34. The upper portion of the divider plate 100 is configured for a handle means 122.

Figure 2:
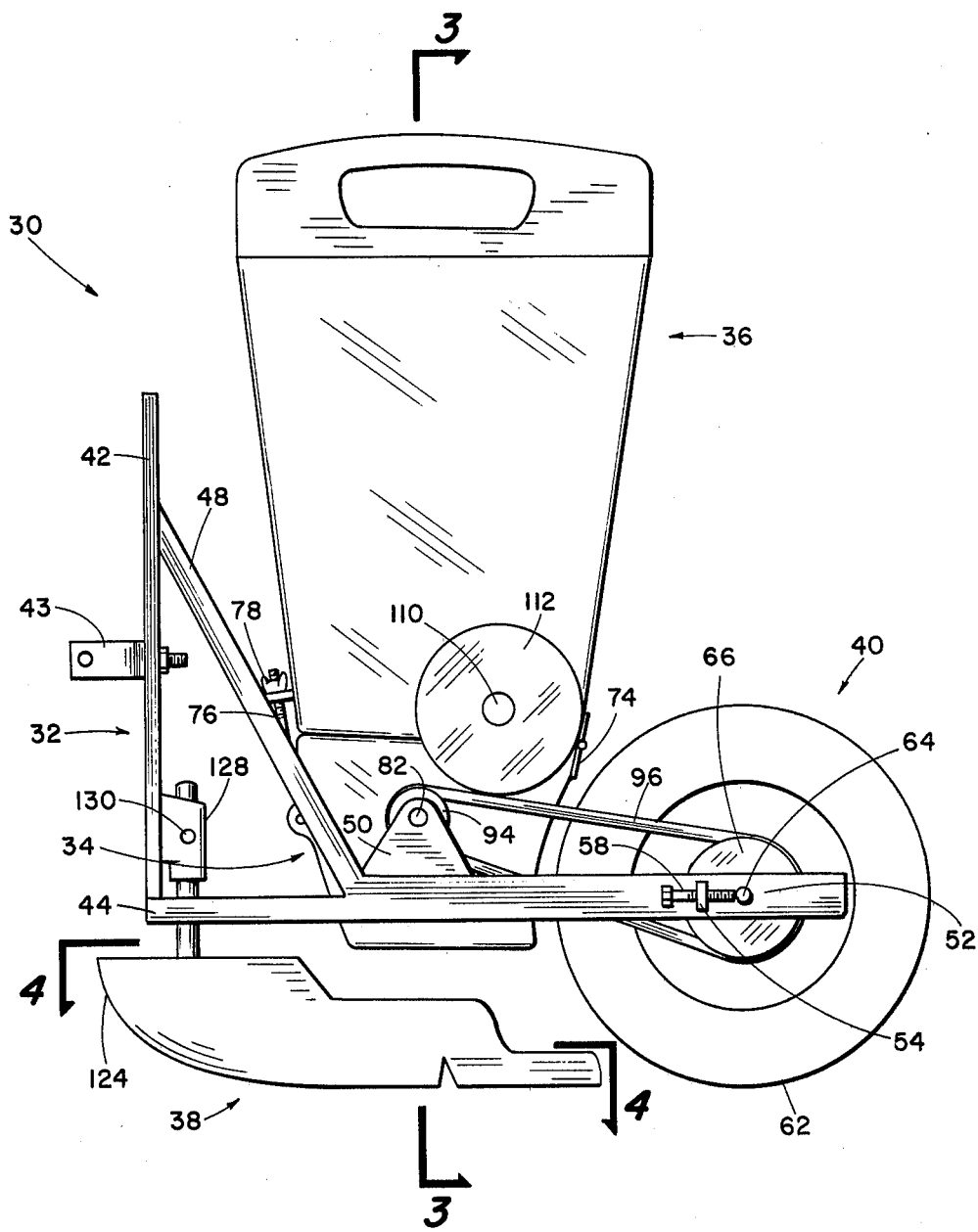
FIG. 2 is a side elevational view of the details of the seed planting mechanism of FIG. 1.
Figures 3, 4:
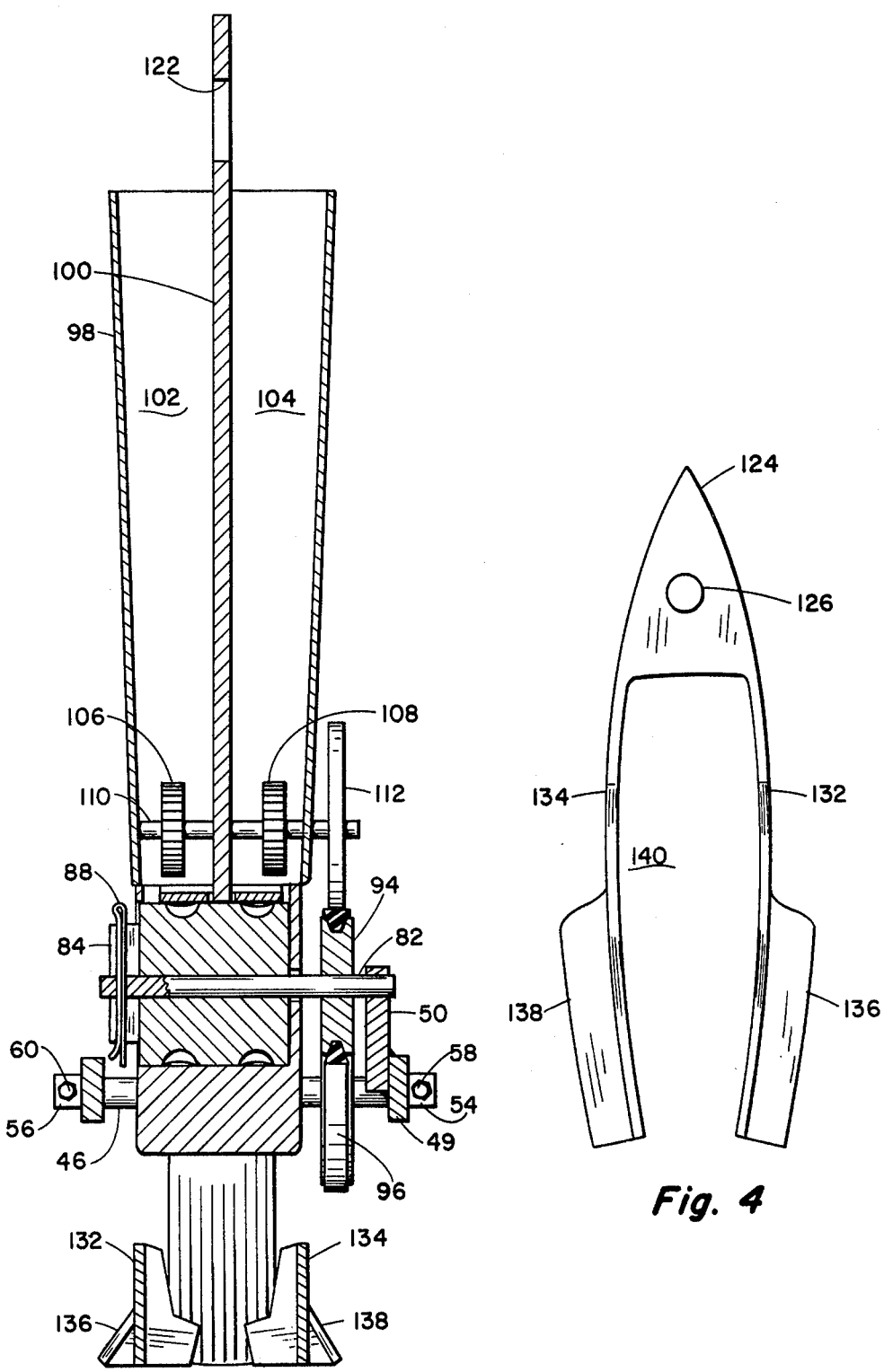
FIG. 3 is a sectional elevational view of the seed planting device of FIG. 2 taken along the broken lines 3—3 of FIG. 2.
FIG. 4 is a plan view of the plow mechanism of FIG. 2 taken along the broken lines 4—4 of FIG. 2.

The plow means 38 generally comprises a forward pointed end 124 which is turned upwardly for cutting a furrow in the earth. The forward end of the plow point or adjacent to the plow point is provided with an upwardly extending attachment post 126 which is adjustably secured to the frame plate 42 by means of a sleeve 128 which is rigidly secured to the said frame plate 42. The post 126 is slidably disposed within the sleeve member 128 and is secured in the desired position by means of a set screw 130. The plow further comprises a pair of rearwardly extending oppositely disposed side walls 132 to 134 which serve to hold the furrow open after it has been opened by the plow point 124. The rear portion of the side walls 132 and 134 are formed in such a manner as to taper toward a closed position at the rear end thereof for the purposes of closing the furrow after it has been opened. To aid in pulling the dirt back into the furrow that has been opened, the lower portion of the side walls 132 and 134 near the rear of the plow unit are flanged outwardly to provide wing-like members 136 and 138 as shown in FIGS. 2, 3 and 4. The spaced apart side walls 132 thereby form an opening in the plow which will be referred to as the planting section 140 and is disposed in a position directly under the opening 72 in the dispensing apparatus 34.

In operation when it is desired to plant some particular seed crop, a plurality of seeds are placed in the hopper 102 and the appropriate fertilizer component placed in the hopper compartment 104. The seed mechanism 30 is attached to the plow frame 10 as hereinbefore described and the entire mechanism is pushed along the ground. The plow point 124 serves to open up a furrow which is held open by the sidewalls of the plow 132 and 134. Seed and fertilizer are agitated within the compartments 102 and 104 and are allowed to descend upon the dispensing wheel 80 on either side of the lower end of the partition 115. As the dispensing wheel 80 rotates, the recesses 90 and 92 therein move upwardly and into open contact with the seed and fertilizer 102 and 104 respectively. Each recess 90 and 92 is then filled to capacity and will rotate under the wiper mechanism 114. The wiper mechanism serves to allow only that amount of seed and fertilizer that is contained with the recesses 90 and 92 to pass by the wiper 114. As the dispensing wheels A continues to rotate the seed and fertilizer will fall into and through the opening 72 and the dispensing apparatus 34 and downwardly into the planting section 140 between the sidewalls 132 and 134 of the plow 38. As the plow 38 moves forwardly, the wing tips 136 and 138 will serve to pull the loose dirt back to close the furrow thereby burying the appropriate amount of seed and fertilizer into the earth. As the apparatus continues to move forward, the drag wheel 62 will pass over the closed furrow thereby packing the dirt therearound.

It is readily seen that a plurality of dispensing wheels 80 may be used having various sized and shaped recesses 90 and 92 for holding different types of seeds with the desired quantities of fertilizer required. Further, it is readily apparent that the circumferential distance between the pairs of recesses 90 and 92 can be altered to directly affect the frequency of depositing seed and fertilizer in the open furrow. Further adjustment of this nature may be made by changing or varying the size of either the pulley wheel 94 or 66 which would in turn directly affect the speed of rotation of the wheel 80 with respect to the drag wheel 62.

Figure 7:
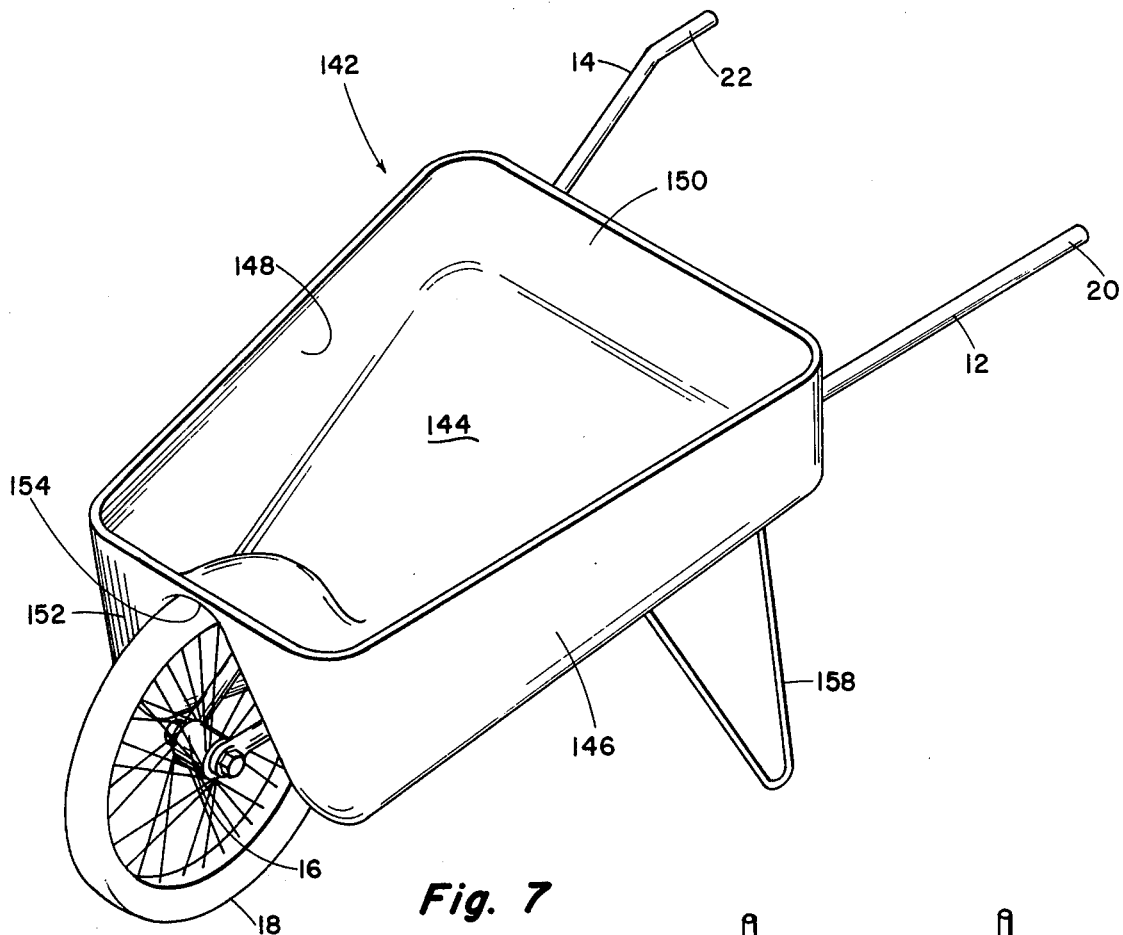
FIG. 7 is a perspective view of the multi-purpose garden plow with a wheelbarrow attachment secured thereto.
Figure 10:
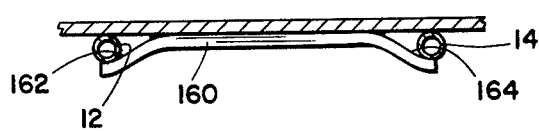
FIG. 10 is a partial sectional view of the wheelbarrow attachment device taken along the broken lines 10—10 of FIG. 8.
Figure 9:
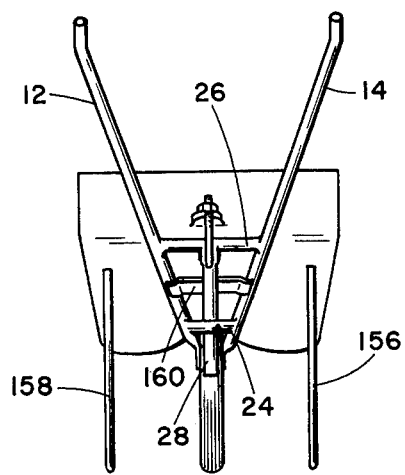
FIG. 9 is a rear elevational view of the device in FIG. 5.
Figure 8:
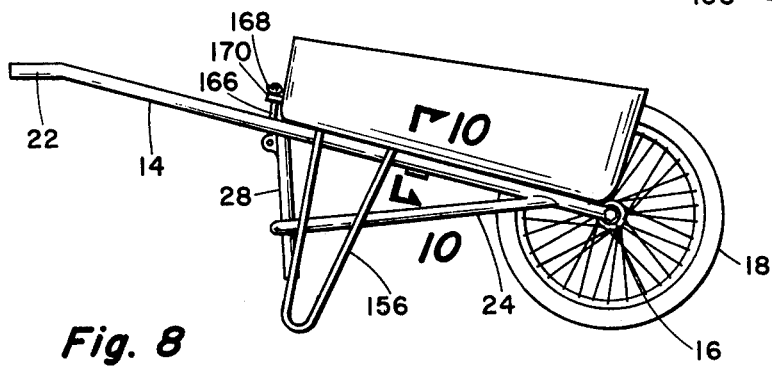
FIG. 8 is a side elevational view of the wheelbarrow attachment of FIG. 5.

Referring now to FIG. 7, 8 and 9, a wheelbarrow attachment indicated by reference character 142 generally comprises a bottom plate 144, sidewalls 146 and 148, a rear end wall 150 and a forward end wall 152. The forward end of the bottom plate 144 and the end wall 152 is provided with a recess 154 which is of a diameter compatible with the diameter with the wheel 18 and for receiving the upper portion of the wheel 18 therein. The lower rear portion of the wheelbarrow bottom 144 is provided with a pair of downwardly extending leg members 156 and 158 for providing a three-point support when the wheelbarrow is not being moved. The bottom of the wheelbarrow is provided with an elongated attachment bar 160 which is disposed traversely with respect to travel of the wheelbarrow mechanism. Each end of the bar 160 is bent or shaped to be spaced from the bottom of the wheelbarrow creating spaces 162 and 164 for receiving the elongated frame members 12 and 14 therein in a manner that will be hereinafter set forth.

Further, the crossbar 26 of the frame member is provided with a pivotable bolt member 166 and associated wing nut 168. The rear base wall 150 of the wheelbarrow body is provided with a U-shaped attachment bracket 170 for receiving the pivotal bolt 166 therein.

When attaching the wheelbarrow mechanism 142 to the plow means 10, the wheelbarrow bottom 144 is placed over the tube members 12 and 14 so that the elongated bar 160 extends down between the rod members 12 and 14 adjacent to the cross member 26. The body member is then pushed forward toward the wheel thereby allowing the wheel to extend into the recess 154 and which will further bring the ends of the bar 160 into contact with the tube members 12 and 14 or, stated another way to receive the rod members 12 and 14 within the openings created at 162 and 164. When this occurs the wheelbarrow body can go no further forward and to retard its rearward motion the pivotal bolt 166 is moved into the U-shaped bracket 170 and tightened by the means of the wing nut 168.

From the foregoing it is readily apparent that the present invention provides a multi-purpose garden implement allowing more complete utilization of an ordinary push-type garden plow mechanism.

Whereas, the present invention has been particularly described in relation to the drawings attached hereto, other and further modifications apart from those shown are suggested herein and may be made within the spirit and scope of the invention.

What is claimed is:

1. A multi-purpose garden tool adapted to be moved over the soil and comprising:
   (a) a frame;
   (b) means for distributing seed carried by the frame; and
   (c) plow carried by the frame and disposed beneath the means for distributing seed, said plow comprising a leading end plow point for opening a furrow, transversely spaced sidewalls attached to the plow point and extending generally rearwardly therefrom for holding the furrow open and for receiving seed from the means for distributing seed therethrough for deposit in the open furrow, the upper trailing portions of the sidewalls being tapered inwardly, the lower trailing portions of the sidewalls extending outwardly to form outwardly extending wing plates for gathering the soil of the open furrow and closing said furrow over the deposited seed.

2. A multi-purpose garden tool as set forth in claim 1 wherein the sidewalls are made as an integral part of the plow point and wherein the wing plates are formed by an upwardly extending notch in each of the sidewalls, with the portion of the sidewalls rearward of said notch being bent outwardly to form said wing plates.

3. A multi-purpose garden tool as set forth in claim 1 wherein the plow is vertically adjustable with respect to the frame means for obtaining the desired depth of the furrow.

4. A multi-purpose garden tool adapted to be moved over the soil and comprising,
(a) a frame;
(b) means for distributing seed and fertilizer carried by the frame; and
(c) a plow carried by the frame and disposed below said distributing means; wherein said distributing means comprises a hopper, a housing open at the top and the bottom thereof, the top opening being in communication with the lower end of said hopper, the bottom opening being disposed over said plow, a rotatable cylinder journaled in said housing and having a transverse axis of rotation relative to the movement of said tool, said cylinder having transversely spaced pairs of recesses in the outer periphery thereof which are rotatable alternately into communication with the top and bottom housing openings, said hopper being provided with a vertical divider plate creating a seed compartment and a fertilizer compartment, the lower end of said plate being in engagement with said cylinder, and an elongated flexible wiper plate having one end thereof connected to the housing, and the opposite end yieldingly contacting said cylinder periphery between the hopper and the top opening of the housing for controlling the levels of seed and fertilizer in said recesses and further serving to separate the top and bottom openings.

5. A multi-purpose garden tool as set forth in claim 4 wherein the end of the wiper plate in yielding contact with the cylinder is provided with a notch therein and turned upwardly to receive the hopper divider plate therein to provide a blunt surface to contact the seed and fertilizer in the cylinder recesses.

* * * * *